US005406692A

United States Patent [19]

Oishi

[11] Patent Number: 5,406,692

[45] Date of Patent: Apr. 18, 1995

[54] WIRE REVERSING APPARATUS IN WIRE TERMINATING EQUIPMENT

[75] Inventor: Masahiro Oishi, Shizuoka, Japan

[73] Assignee: Yazaki Corporation, Tokyo, Japan

[21] Appl. No.: 93,619

[22] Filed: Jul. 20, 1993

[30] Foreign Application Priority Data

Aug. 10, 1992 [JP] Japan .................................. 4-212590

[51] Int. Cl.[6] ...................... B23P 23/06; H01R 43/033

[52] U.S. Cl. .................................... 29/564.6; 29/33 F; 29/34 D; 29/753; 140/102

[58] Field of Search ............... 29/747, 748, 753, 33 F, 29/34 D, 564.6; 72/155, 156; 140/1, 102

[56] References Cited

U.S. PATENT DOCUMENTS

| | | | |
|---|---|---|---|
| 2,810,421 | 10/1957 | Dolney et al. | 72/155 X |
| 3,100,512 | 3/1963 | Sage | 140/102 |
| 4,375,229 | 3/1983 | Mikani et al. | 29/753 X |
| 4,638,558 | 1/1987 | Eaton | 29/33 F X |

FOREIGN PATENT DOCUMENTS

| | | | |
|---|---|---|---|
| 118929 | 5/1987 | Japan | 140/102 |
| 64-5424 | 1/1989 | Japan . | |
| 932227 | 7/1963 | United Kingdom | 72/155 |
| 1011988 | 12/1965 | United Kingdom | 140/102 |
| 1682002 | 10/1991 | U.S.S.R. | 72/155 |

*Primary Examiner*—Peter Dungba Vo
*Attorney, Agent, or Firm*—Armstrong, Westerman, Hattori, McLeland & Naughton

[57] ABSTRACT

This invention concerns an improvement in the wire reversing apparatus in the wire terminating equipment that fabricates terminal-attached wires of wiring harness. The turntable, which forms the wire into a loop by reversing one end of the wire fed out from the wire supply device, is provided at the underside with a gear secured to the rotating center thereof. A drive gear shaft that meshes with the gear of the turntable is shifted toward the wire feeding side so that the wire ends will not strike against the drive gear shaft to be bent when the wire is carried by a carrier chain in a direction perpendicular to the wire feeding direction.

3 Claims, 9 Drawing Sheets

WIRE REVERSING APPARATUS IN WIRE TERMINATING EQUIPMENT

BACKGROUND OF THE INVENTION

Field of the Invention

The present invention relates to an improvement of a wire reversing apparatus in a wire terminating equipment that makes terminal-attached wires of wiring harness.

Description of the Prior Art

FIG. 5 is an outline perspective view of a conventional wire terminating equipment and FIG. 6 is a perspective view of a wire reversing apparatus in the equipment (Japanese Patent Publication No. Showa 64-5424).

In these figures, the front end 1*a* of a wire 1 fed out from a wire supply device A is held by a wire clamp 3 provided on the underside of a reversing body 2 in a wire reversing apparatus B (FIG. 7) and reversed toward a direction opposite the wire feeding direction by turning the reversing body 2 through 180 degrees to form a semicircular arc of wire (FIG. 8). Then, the other side 1*b* of the arc wire opposite to the clamped end 1*a* is fed a predetermined length by the wire supply device A, measured, and cut by a cutter 4 (FIG. 9). Designated 5 is an endless carrier chain which has wire holders 6 arranged at equal pitches. Holding the both ends 1*a*, 1*a'* of the wire 1, the wire holders 6 are moved intermittently one pitch at a time simultaneously with the turning of the reversing body 2.

In FIGS. 6 and 7, denoted 7 is a wire supply roll, 8 an oscillating nozzle, 9 a wire winding disk to prevent wire from having undesired distortions during reversing, C a wire stripper that removes an insulation from the end of the wire (FIG. 5), D a detector to determine whether the wire stripping has been carried out correctly, E a terminal crimping device, and F a detector to check the crimped condition of the terminal.

As shown in FIG. 5, since the wire reversing apparatus B has a rotary drive section $B_1$ for the reversing body 2 located in the upper part thereof, inspection and repair is difficult to be performed. That is, the apparatus has poor maintainability.

To cope with this problem, a construction has been conceived as shown in FIG. 10, in which a rotating shaft 10 of the turntable (reversing body) 2' is located under the turntable. In the figure denoted 3' is a wire clamp. In this construction, however, when the wire is subjected to the reversing, feeding and cutting operations, the cut surfaces 1*b*, 1*b'* of both ends are always located on a line P that is parallel to the carrier chain 5 and passes through the center of the rotating shaft 10. Hence, as the both ends 1*a*, 1*a'* of the wire 1 are gripped by the wire holders 6 of the carrier chain 5 and moved intermittently, one of the ends 1*a'* will be bent by striking against the rotating shaft 10, as indicated by an imaginary line in FIG. 10 and a solid line in FIG. 11. This necessitates the provision of a wire end correction device G to rectify the bent portion 1*c* before the wire ends are terminated as by the crimping device E. This increases the manufacturing cost.

SUMMARY OF THE INVENTION

The present invention has been accomplished with a view to overcoming the above drawback and aims to provide a wire reversing apparatus which does not bend the wire end when intermittently moving the wire in a direction perpendicular to the feeding direction after it is reversed, fed and cut, and which therefore does not require the wire end correction device and can be used as is in the existing wire terminating equipment.

To achieve the above objective, the wire reversing apparatus according to this invention comprises, as claimed in claim 1: a turntable; wire clamps provided on the turntable which are opened and closed; a gear secured to the rotating center of the underside of the turntable; and a drive gear shaft that meshes with the gear of the turntable, the drive gear shaft being shifted toward the wire feeding side; whereby the front end of a wire fed out from a wire supply device is held by the wire clamp and then reversed by the turntable toward the direction opposite the wire feeding direction to form the wire into an arc, after which the rear end of the arc wire is fed out a predetermined length to form a loop of wire by the wire supply device and then cut, and the cut looped wire is carried in a direction perpendicular to the wire feeding direction.

Although a follower gear of the turntable is located at the center of the turntable, a drive gear is off-centered, so that the both ends of a wire can be transferred without touching the gear shaft, thus eliminating the problem of the bending.

DETAILED DESCRIPTION OF PREFERRED EMBODIMENT

Figure 1:
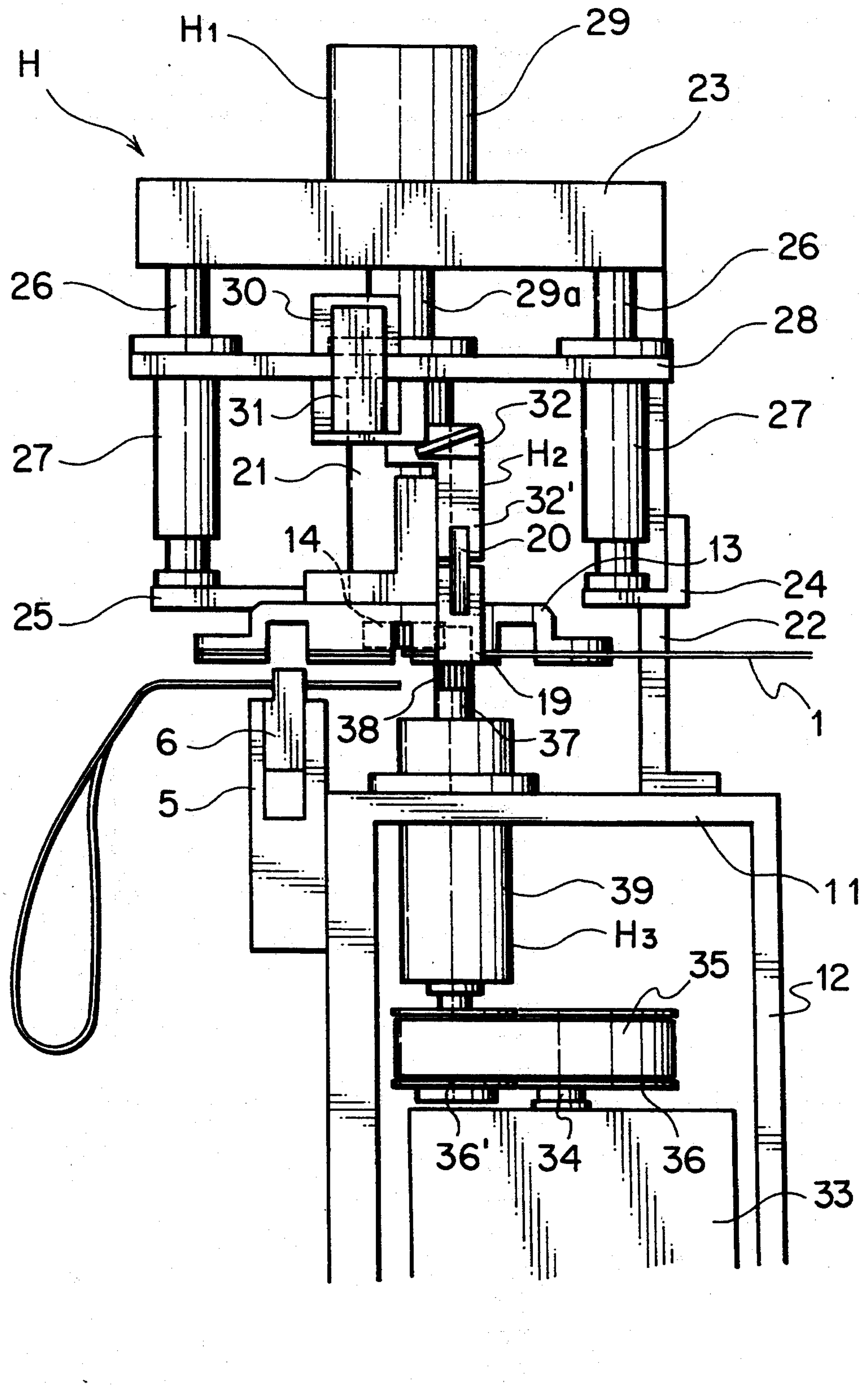
FIG. 1 is a side view of the wire reversing apparatus as one embodiment of this invention.
Figure 2:
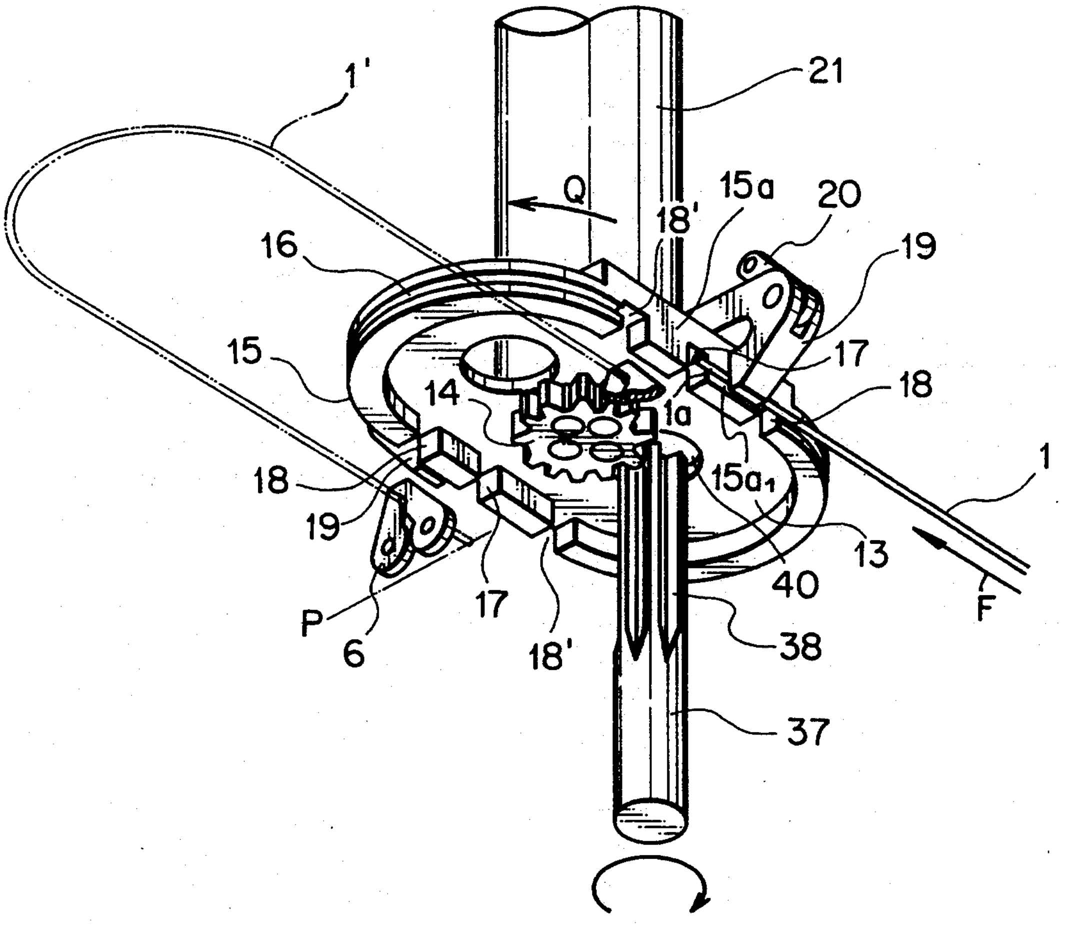
FIG. 2 is a perspective view of the turntable as seen from the direction of arrow Y.
Figure 3:
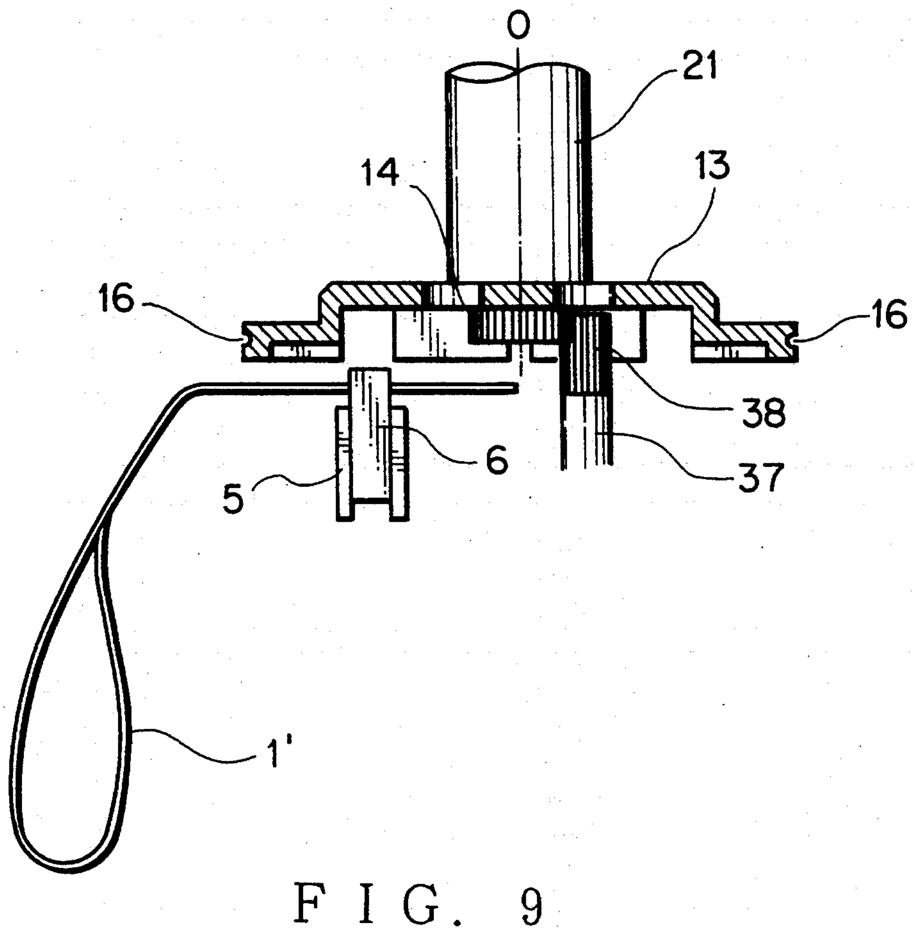
FIG. 3 is a vertical cross section of FIG. 2.
Figure 9:
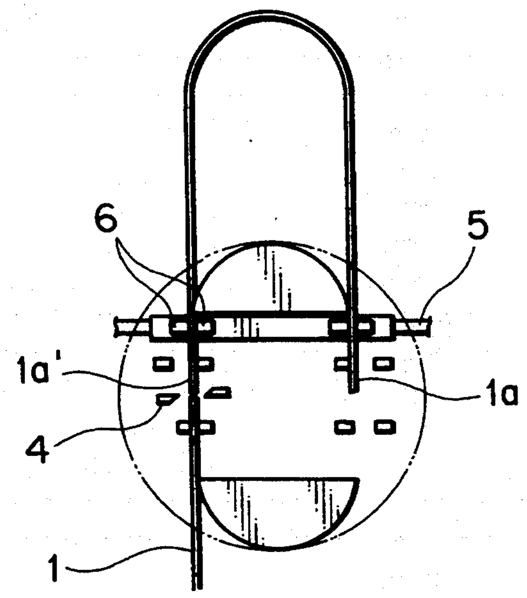
F I G. 9 PRIOR ART
FIG. 9 is an explanatory view showing the next step in FIG. 8.

FIG. 1 shows a side view of the wire reversing apparatus, FIG. 2 a perspective view of a drive section for the turntable as seen from the direction of arrow Y in FIG. 1, and FIG. 3 a cross section of FIG. 2.

In FIG. 1, designated H is a wire reversing apparatus and 11 a mounting frame. Provided on the mounting frame 11 are a turntable 13, a lifting mechanism $H_1$ for the turn table, and a clamp operating mechanism $H_2$. Between legs 12, 12 of the mounting frame 11 is provided a rotary drive section $H_3$ for the turntable. On one side of the mounting frame 21 is arranged a carrier chain 5 having wire holders 6.

As shown in FIGS. 2 and 3, the turntable 13 is a slightly elongate plate member with both ends formed in arc. The turntable 13 has a gear 14 fixed to the center of the underside thereof and loop forming walls 15 at the circumferential edges.

The loop forming walls 15 are formed point-symmetrical about the rotating shaft (gear 14) of the turntable 13 and has a wire guide-groove 16 on the arc circumferential surfaces at both ends. Side wall portions 15*a* on both sides of the turntable 13 are formed with notches 17 at the center thereof for cutting the wire and, on both sides of each notch 17, are also formed with notches 18′ for transferring the wire.

On the turntable 23, two wire clamps 19, 19 are provided in a point-symmetrical relationship. Each wire clamp 19 faces a divided side wall portion 15*a*$_1$ of the side wall portion 15*a* between the wire cutting notch 17 and the wire transferring notch 18 on the wire feeding side and can be opened and closed. Denoted 20 is a link for opening and closing the wire clamp 19.

Turning to FIG. 1, the lifting mechanism $H_1$ for the turntable 13 includes a turntable shaft 21, a holder plate 28, and an air cylinder 29 for lifting or lowering the holder plate 28. A stand 22 erected on one side of the mounting frame 11 has a top plate 23 secured to the upper end thereof. Four guide rods 26 are vertically erected between the top plate 23 and a bracket 24 and stay 25—which is secured to the intermediate portion of the stand 22. The holder plate 28 is mounted vertically slidable on the guide rods 26 through rod guides 27. The holder plate 28 is connected to a piston rod 29*a* of the air cylinder 29 provided to the top plate 23 and is vertically movable.

The holder plate 28 rotatably supports the upper end of the turntable shaft 21, whose lower end passes through the turntable 13 and is rigidly secured to the gear 14.

The clamp operating mechanism H2 comprises: the air cylinder 30 provided to the holder plate 28; a link joint 31 linked with the operation of the air cylinder 30; and clamp operating links 32, 32′ which are loosely connected at one end with the link joints 31 and at the other end connected with the links 20 of the wire clamps 19. The clamp operating link 32 is rotatably connected to the link joint 31.

The rotary drive section $H_3$ consists of: an index drive 33 installed between the legs 12, 12; a drive gear shaft 37 connected to the output shaft 34 of the index drive 33 through a timing belt 35 and pulleys 36, 36′; and a bearing box 39 secured to the mounting frame 11. Column gear 38 or spline formed at the upper end portion of the drive gear shaft 37 is in mesh with the gear 14 of the turntable 13.

As shown in FIG. 3, the column gear 38 (the drive gear shaft 37) is shifted from the center 0 of the turntable 13 toward the supply side of the wire 1. The turntable 13 is formed with an escape opening 40 for the column gear 38.

Next, the operation of the wire reversing apparatus H will be described.

Figure 5:
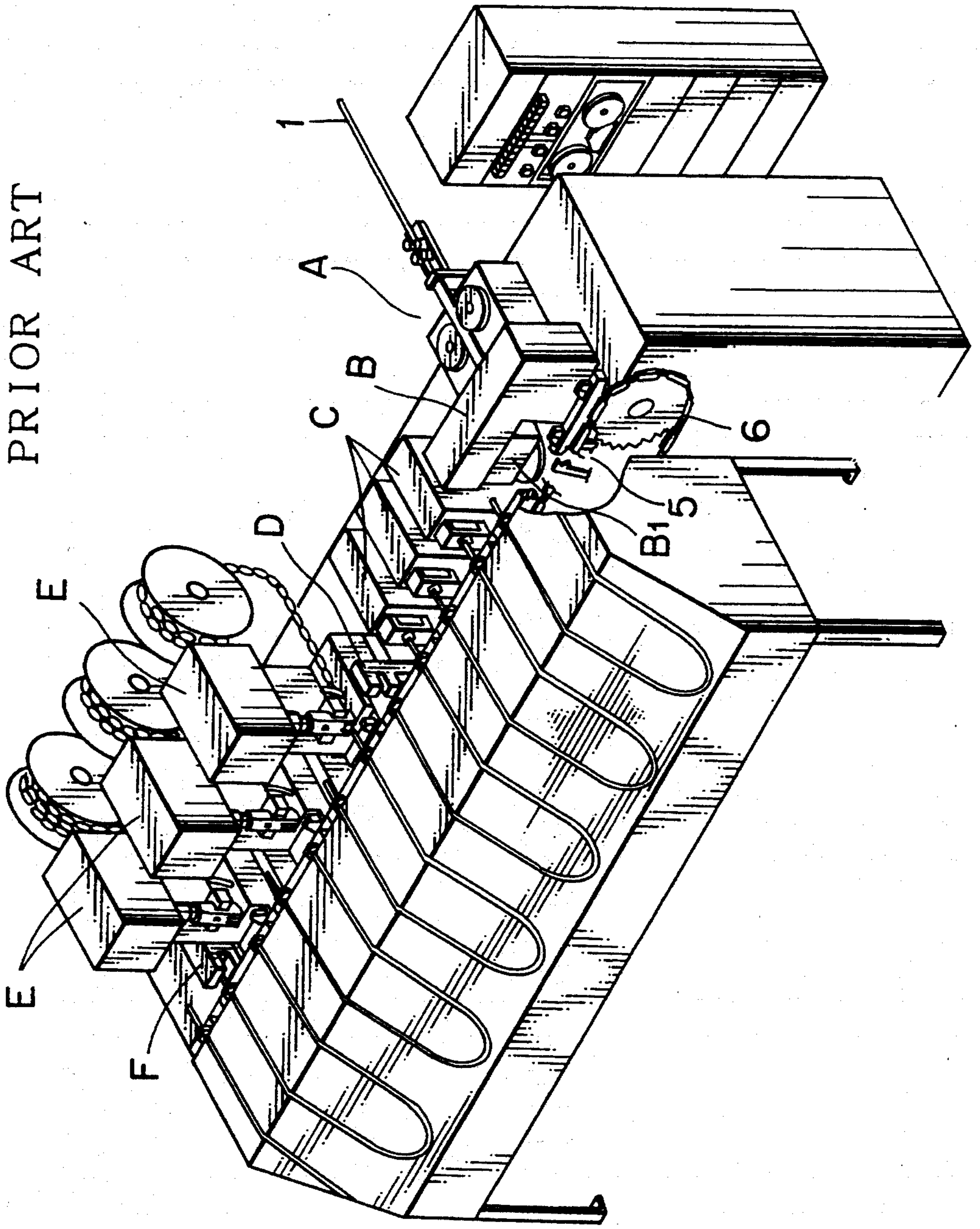
FIG. 5 PRIOR ART
FIG. 5 is an outline perspective view of a conventional wire terminating equipment.
Figure 6:
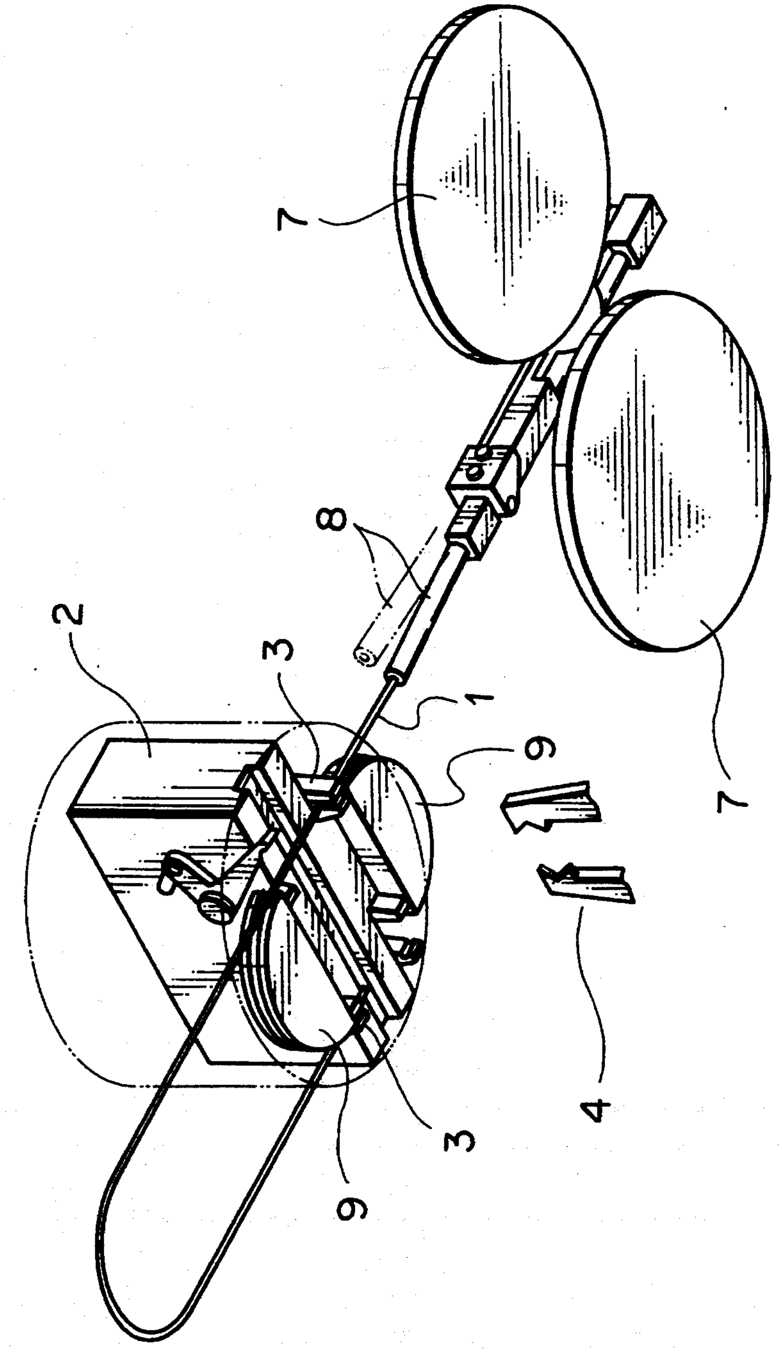
FIG. 6 PRIOR ART
FIG. 6 is a perspective view showing the relationship between the reversing body and the wire supply roll in FIG. 5.
Figure 7:
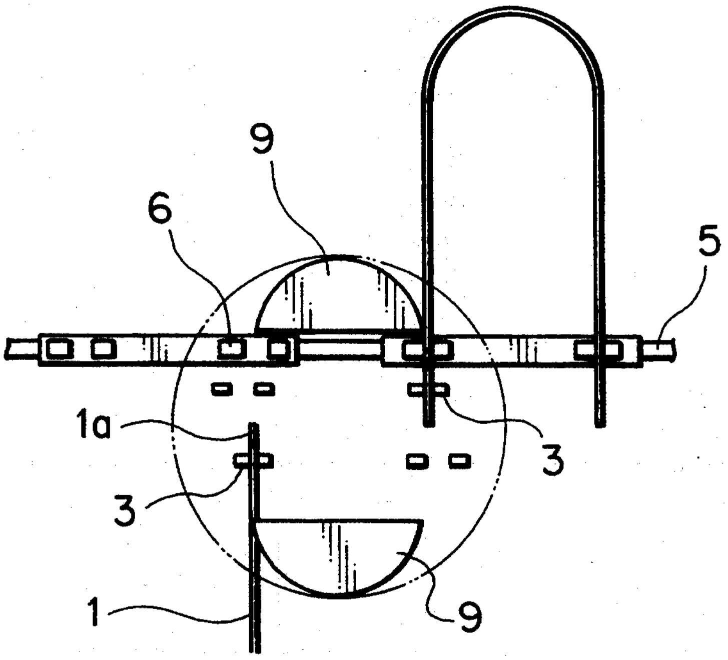
FIG. 7 PRIOR ART
FIG. 7 is an explanatory view showing the reversing body and the wire transfer process in FIG. 5.
Figure 8:
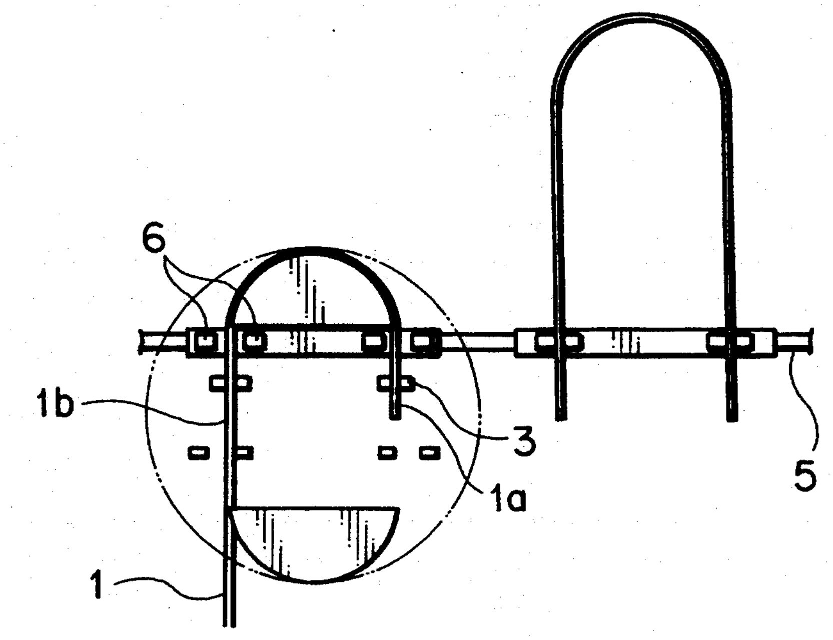
FIG. 8 PRIOR ART
FIG. 8 is an explanatory view showing the next step in FIG. 7.
Figure 10:
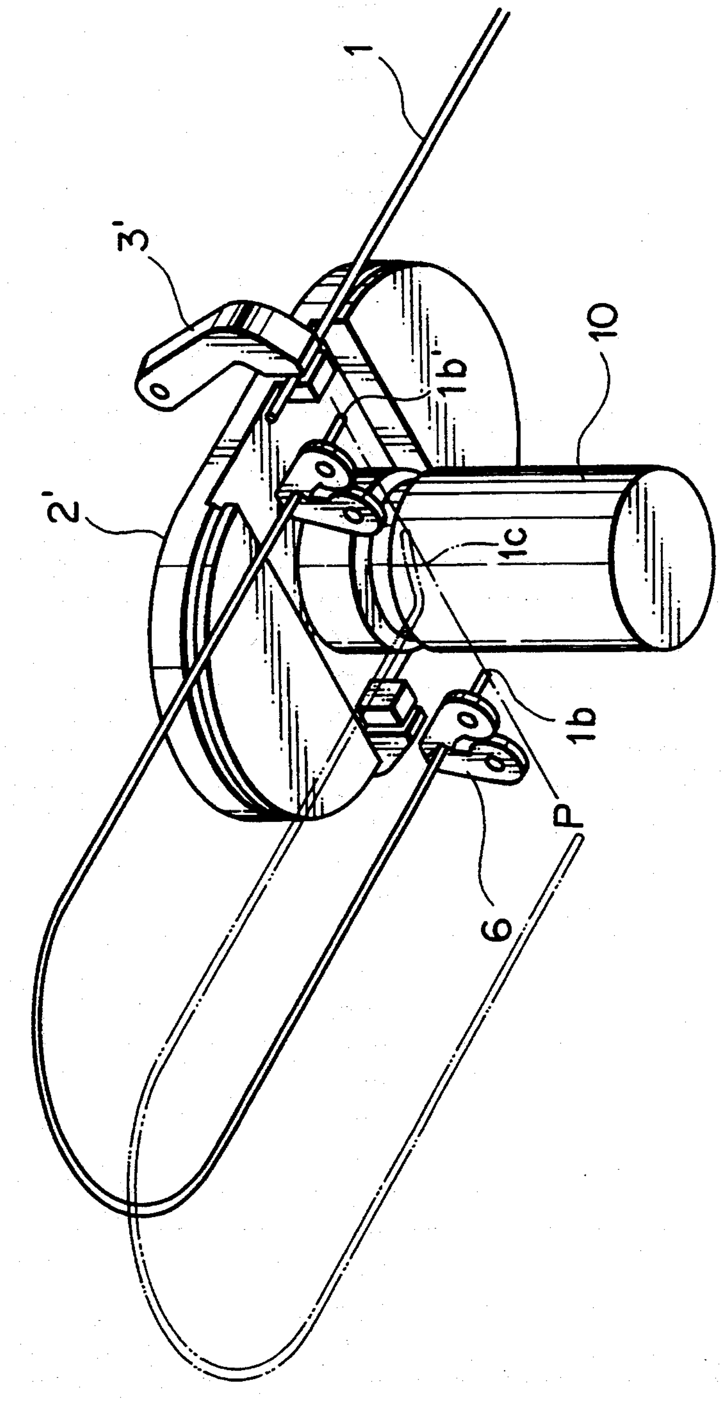
FIG. 10 PRIOR ART
FIG. 10 is an explanatory view showing another turntable used in explaining the invention.
Figure 11:
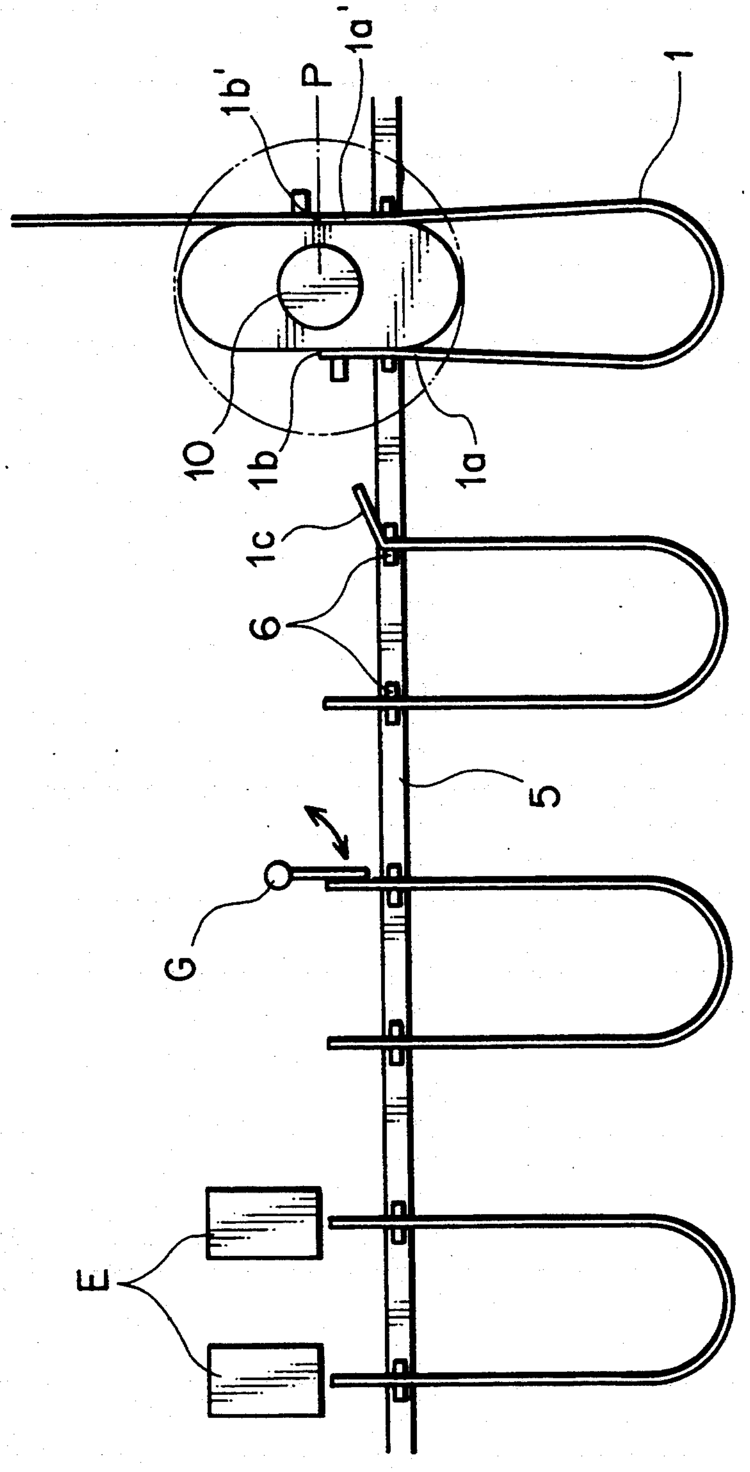
FIG. 11 PRIOR ART
FIG. 11 is an explanatory view showing the turntable and the wire transfer process in FIG. 10.

In FIG. 2, the front end 1*a* of the wire 1 fed out from the wire supply device (see FIG. 5) is held between the side wall portion 15*a*$_1$ of the loop forming wall 15 in the turntable 13 and the wire clamp 19. Clamped in this condition, the wire is formed into a loop 1′ as indicated by an imaginary line in the following process.

First, the turntable 13 is rotated through 180 degrees in the direction of arrow Q by the operation of the rotary drive section $H_3$. That is, the front end 1*a* of the wire is reversed toward the direction opposite the feeding direction (the wire feeding direction being labelled with reference letter "F" in FIG. 2) to form a semicircular arc of wire, and then the wire supply device feeds out the wire a predetermined length to make a loop of wire, after which the other wire clamp 19 is closed to hold the rear portion of the wire loop. Then, the turntable 13 is slightly lowered by operating the lifting mechanism $H_1$ to cause the wire ends to be held by the wire holders 6 at the wire transferring notches 18, 18′ and at the same time to be cut by cutters not shown at the wire cutting notches 17. Then, the turntable 13 is raised to its original position.

In the condition of FIG. 2, the turntable 13 is again rotated in the direction of arrow Q while at the same time the carrier chain 5 is shifted one pitch. When the wire is being fed out, the carrier chain 5 is further shifted one pitch. This process is repeated to form looped wires of a specified length successively.

Figure 4:
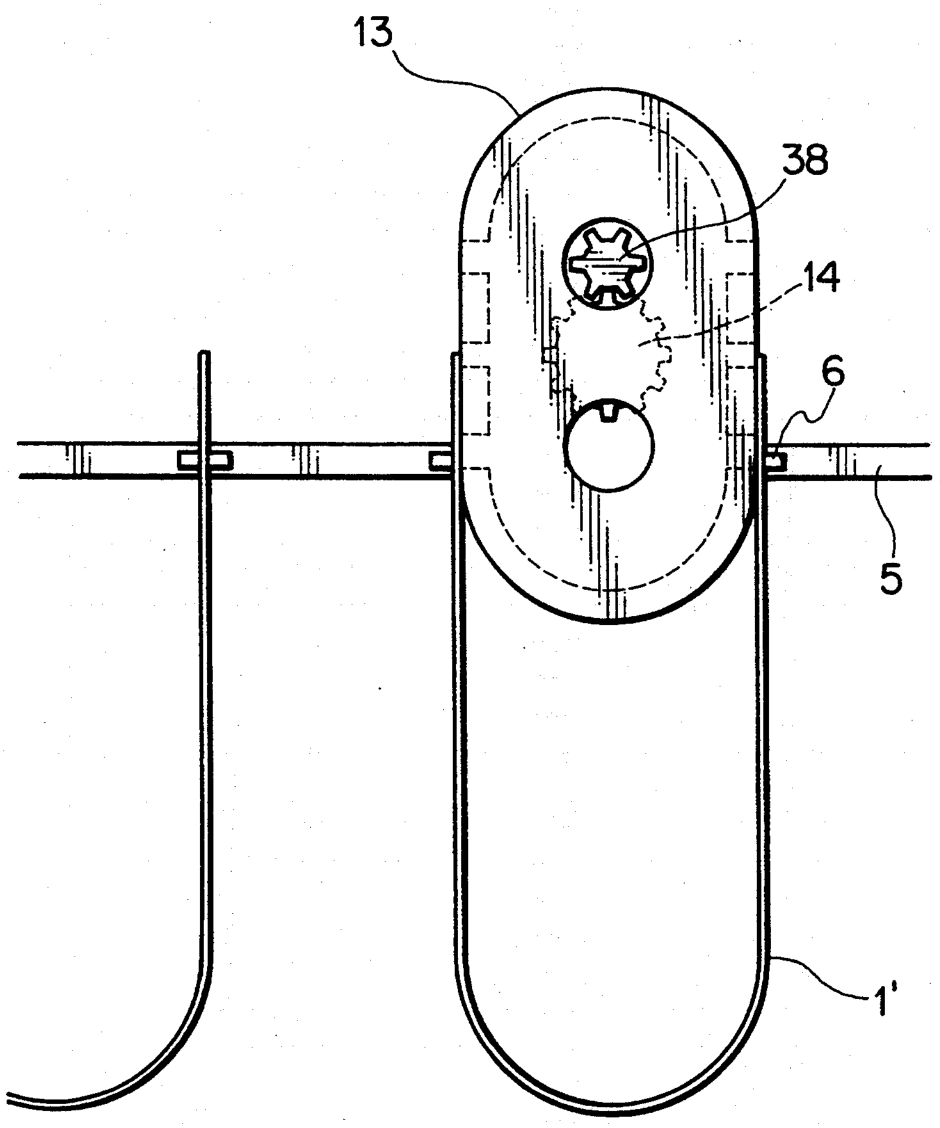
FIG. 4 is an explanatory view showing the turntable and the wire transferring process.

The above process is the same as in the conventional example of FIG. 6 to FIG. 9. In this invention, however, as shown in FIG. 2 to FIG. 4, the drive gear shaft 37 of the turntable 13 is shifted toward the wire supply side. Hence, when the looped wire 1′ is moved by the carrier chain 5 in a direction perpendicular to the wire feeding direction F, the rear end 1*a′* of the looped wire can be prevented from interfering with the drive gear shaft 37 and therefore from being bent.

As described above, since the wire end is not bent by the rotating shaft of the turntable, as was the case with the conventional apparatus, there is no need to provide a wire correction mechanism, improving the quality of the terminated wires.

Furthermore, since the reversing drive section of the turntable is located beneath the turntable, maintenance becomes easy and the apparatus can be reduced in size. Moreover, this apparatus can be applied as is to the conventional wire terminating equipment.

While the invention has been particularly shown and described in reference to preferred embodiments thereof, it will be understood by those skilled in the art that changes in form and details may be made therein without departing from the spirit and scope of the invention.

What is claimed is:

1. A wire reversing apparatus in a wire terminating equipment, comprising:

a turntable;

wire clamps provided on the turntable, which are opened and closed;

a gear secured to a rotating center of the underside of the turntable; and a drive gear shaft that meshes with the gear of the turntable, the drive gear shaft being shifted toward a wire feeding side which is toward a direction opposite a wire feeding direction, the wire feeding direction being a direction in which the wire is fed from a wire supply device;

whereby the front end of a wire fed out from the wire supply device is held by one of the wire clamps and then reversed by the turntable toward a direction opposite the wire feeding direction to form the wire into an arc, after which the rear end of the arc wire is fed out a predetermined length to form a loop of wire by the wire supply device and then cut, and the cut looped wire is carried in a direction perpendicular to the wire feeding direction.

2. A wire reversing apparatus according to claim 1, wherein the turntable is lowered to have the rear end of the wire cut after the loop of wire is formed.

3. A wire reversing apparatus according to claim 2, wherein the the turntable is formed with an escape opening for the drive gear shaft.

* * * * *